No. 897,319. PATENTED SEPT. 1, 1908.
E. B. STIMPSON.
STUD OR RIVET.
APPLICATION FILED DEC. 11, 1906.

Witnesses:
F. N. Hinman
William J. Firth

Inventor
Edwin Ball Stimpson
By his Attorney

UNITED STATES PATENT OFFICE.

EDWIN BALL STIMPSON, OF NEW YORK, N. Y., ASSIGNOR TO EDWIN B. STIMPSON COMPANY, A CORPORATION OF NEW YORK.

STUD OR RIVET.

No. 897,319.  Specification of Letters Patent.  Patented Sept. 1, 1908.

Application filed December 11, 1906. Serial No. 347,265.

*To all whom it may concern:*

Be it known that I, EDWIN BALL STIMPSON, a citizen of the United States, residing in the borough of Brooklyn, county of Kings, city and State of New York, have invented certain new and useful Improvements in Studs or Rivets, of which the following is a specification.

This invention relates to certain improvements in studs or rivets, and more particularly in that class of such devices which are adapted for use in connection with automobile tires for protecting the same against wear and injury from obstructions in the road and for preventing skidding, and the object of the invention is to provide a device of this general character of a simple and comparatively inexpensive nature and of a strong and durable construction having improved means whereby the device is rendered capable of resisting wear without lessening its adaptability for application to the tire protector or other device for use.

The invention consists in certain novel features of the construction, and combinations and arrangements of the several parts of the improved stud or rivet, whereby the same is rendered simpler, cheaper and otherwise better adapted and more convenient for use, all as will be hereinafter fully set forth.

The novel features of the invention will be carefully defined in the claims.

Figure 1:
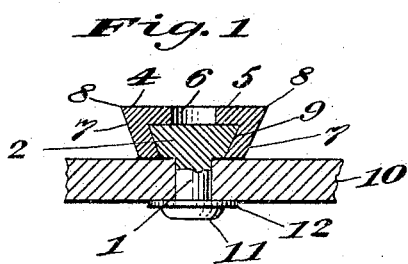
Figure 2:
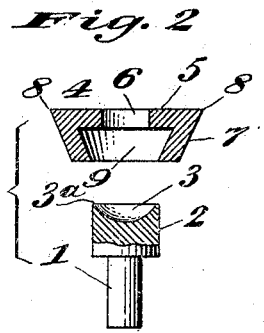
Figure 3:
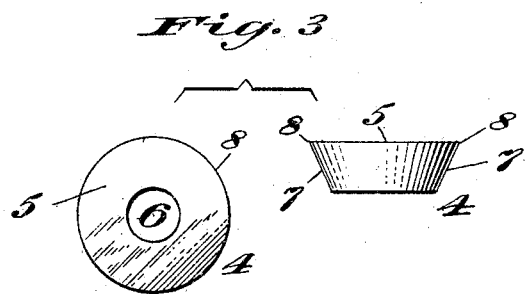
Figure 4:
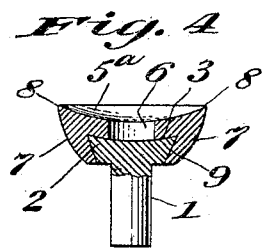
Figure 5:
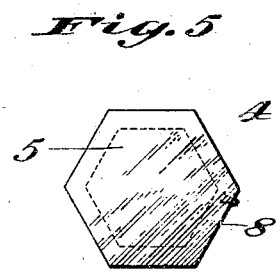

In the accompanying drawings which serve to illustrate my invention—Figure 1 is a sectional view taken axially through a stud or rivet embodying my improvements and showing the same set in position for use in the material of a tire protector or the like; Fig. 2 is a sectional view, showing the parts of the stud or rivet constructed according to my invention as they appear prior to being assembled and set in a tire protector or other device; Fig. 3 is a view showing, in plan and edge elevation, the head or cover portion of the improved stud or rivet; Fig. 4 is a sectional view taken axially through a stud or rivet wherein my improvements are embodied in a modified form, and Fig. 5 is a view showing in plan a modified formation of the head of the stud or rivet also comprised in the present invention.

As shown in Figs. 1, 2 and 3, the improved stud or rivet comprises a body portion 1, produced from malleable or pliant metal and comprising a shank portion adapted to be passed through the material of the tire protector or other device in which the stud or rivet is to be set for use in such fashion as to securely hold the said stud in place therein. The said body portion also comprises a head or enlargement 2 at the upper or outer end of said shank and made in cylindrical form of greater diameter than the shank, and provided with a recess or hollow produced in its upper surface, whereby said upper surface is made concave as shown at 3 and produces, at its juncture with the cylindric sides of the head or enlargement an upwardly turned thin annular fin or edge portion having an acute angle in cross section as shown at 3ª in the drawings. The improved stud or rivet constructed according to my invention also comprises a cap or cover member 4, of shell like nature, which is formed from hardened steel or other resisting material and is designed to be applied over the softer malleable head 2 of the body portion 1 in such manner as to inclose the same to protect it against wear and also to afford secure contact upon the roadway to prevent skidding. As shown in Figs. 1, 2 and 3, the said shell-like cap or cover 4 has a flattened or plane top or outer surface 5 to impinge upon the roadway, and is provided with a central aperture 6 whereby additional tractive capacity is gained, and the side-walls 7, of said cap are bent or turned inwardly toward their lower or inner edge portions, so as to meet the circumference of the flattened or plane surfaced outer end 5 at an acute angle as shown at 8, the said acute angle thus produced being adapted, when the device is set in a tire protector, to sink in the roadway to a much greater extent than would a right-angled engaging surface, whereby increased tractive and anti-skidding effect is attained.

It will therefore be apparent that the shell-like cap or cover member 4 is given the form of a conic frustum, and since the metal of which it is formed is of substantially equal thickness throughout, it will be apparent that the interior cavity or hollow 9 of said cap or cover member will also have the form of a conic frustum, its wider part being immediately beneath the flattened outer face 5, while its narrower neck portion is at the inner or lower end of the cap or cover member.

In the manufacture of the improved stud or rivet, the head or enlargement 2 of the soft or malleable body portion 1 will be made in a diameter adapting it to be snugly entered within the contracted neck portion of said hollow or cavity 9 of the cap or cover member, and when the said head or enlargement 2 is so applied within said cavity or hollow 9, the annular raised edge portion or fin 3ª surrounding the top surface of said head 2 will contact upon the under or inner surface of the top 5 of the cap or cover member 4, so that when pressure is applied to the parts, as by a blow, for example, the malleable nature of the head or enlargement 2 will permit it to expand laterally and thereby closely fill the larger upper or outer part of the cavity or hollow 9 of the cap or cover member as shown in Fig. 1, so as to afford a secure connection of the same to the malleable body portion.

As shown herein, the shank of the body portion 1 is made in cylindrical form so as to be adapted to be passed through a sheet of material 10, which may be a protective tire covering or other device, after the fashion of a rivet, and the inner projecting end or extremity of said shank may thereafter be upset or riveted as shown at 11 in a well known way for holding the device in place. A washer or gasket 12 is herein shown as applied over the said inner end of the shank before the riveting operation. The particular formation of the said shank is, however, immaterial to the present invention.

In Fig. 4 I have shown a modified formation of the improved stud or rivet wherein the top surface 5ª of the cap or cover member 4 is made recessed or hollowed at its central part so as to have a concave form, whereby the acute nature or the circumferential engaging surface or edge 8 is made more pronounced to enable it to sink deeper into the roadway for increased tractive and anti-skidding effect.

In Fig. 5 I have shown still another modified formation of the device wherein the cap or cover member 4 has a polygonal formation, the angles thereby produced in the edge surface 8 affording additional tractive and anti-skidding capacity.

Having thus described my invention, I claim—

A stud for the purpose specified, having a malleable head swaged into the cavity of the hard, cup-like steel cover, the said cover being contracted about its sides and extending over the crown of said head, and said cover having in it an aperture, as set forth.

In witness whereof I have hereunto signed my name this 10th day of Dec., 1906, in the presence of two subscribing witnesses.

EDWIN BALL STIMPSON.

Witnesses:
WILLIAM J. FIRTH,
H. G. HOSE.